(12) United States Patent
Kim et al.

(10) Patent No.: US 10,425,988 B1
(45) Date of Patent: Sep. 24, 2019

(54) NETWORK CODING METHOD AND APPARATUS FOR RELIABLE COMMUNICATION IN LORA COMMUNICATION SYSTEM

(71) Applicant: Pusan National University Industry-University Cooperation Foundation, Busan (KR)

(72) Inventors: Jong-Deok Kim, Busan (KR); Seung-gyu Byeon, Busan (KR); JunHwan Huh, Busan (KR); Jae-Min Lee, Busan (KR); Dong-Hyun Kim, Busan (KR)

(73) Assignee: Pusan National University Industry—University Cooperation Foundation, Busan (KR)

( * ) Notice: Subject to any disclaimer, the term of this patent is extended or adjusted under 35 U.S.C. 154(b) by 0 days.

(21) Appl. No.: 16/274,554

(22) Filed: Feb. 13, 2019

(30) Foreign Application Priority Data

Dec. 21, 2018 (KR) ........................ 10-2018-0166976

(51) Int. Cl.
| | | |
|---|---|---|
| *H04L 12/66* | (2006.01) | |
| *H04W 88/16* | (2009.01) | |
| *H04W 4/80* | (2018.01) | |
| *H04L 5/00* | (2006.01) | |
| *H04W 72/04* | (2009.01) | |

(52) U.S. Cl.
CPC ........... *H04W 88/16* (2013.01); *H04L 5/0055* (2013.01); *H04L 5/0098* (2013.01); *H04W 4/80* (2018.02); *H04W 72/0446* (2013.01)

(58) Field of Classification Search
CPC .......... H04L 5/00; H04L 12/66; H04W 76/02; H04W 36/00
See application file for complete search history.

(56) References Cited

U.S. PATENT DOCUMENTS

| | | | |
|---|---|---|---|
| 2016/0072851 A1* | 3/2016 | Bade ..................... | H04L 63/306 709/217 |
| 2017/0163329 A1* | 6/2017 | Dangy-Caye ....... | H04L 12/2834 |
| 2018/0092152 A1* | 3/2018 | Rodbro ................ | H04W 76/18 |

FOREIGN PATENT DOCUMENTS

| | | |
|---|---|---|
| KR | 101779202 B1 | 9/2017 |
| KR | 20180019321 A | 2/2018 |

(Continued)

OTHER PUBLICATIONS

Rober Miller, "MWR Labs Whitepaper, LoRa Security, Building a Secure LoRa Solution", NPL, labs.mwrinfosecurity.com, Mar. 22, 2016, pp. 1-18 (Year: 2016).*

(Continued)

*Primary Examiner* — Lan-Huong Truong
(74) *Attorney, Agent, or Firm* — EIP US LLP

(57) ABSTRACT

Disclosed are a network coding method and apparatus for reliable communication in a LoRa communication system. The network coding apparatus may include a network server connected to an end node over a network to receive a packet transmitted by the end node in a LoRa communication system, a stationary gateway positioned between the network server and the end node to deliver the packet, transmitted by the end node, to the network server, and a temporary gateway positioned between the stationary gateway and the end node to deliver the packet, transmitted by the end node, to the stationary gateway.

8 Claims, 5 Drawing Sheets

(56) References Cited

FOREIGN PATENT DOCUMENTS

| KR | 10-1866977 B1 | 6/2018 |
| KR | 101926276 B1 | 12/2018 |

OTHER PUBLICATIONS

Korean Office action dated Mar. 1, 2019 for Korean Application 10-2018-0166976.

\* cited by examiner

NETWORK CODING METHOD AND APPARATUS FOR RELIABLE COMMUNICATION IN LORA COMMUNICATION SYSTEM

CROSS REFERENCE TO RELATED APPLICATION

This application is based on and claims priority under 35 U.S.C. 119 to Korean Patent Application No. 10-2018-0166976, filed on Dec. 21, 2018, in the Korean Intellectual Property Office, the disclosures of which is herein incorporated by reference in their entireties.

BACKGROUND OF THE INVENTION

1. Technical Field

The following embodiments relate to a LoRa communication system and, more particularly, to a network coding method and apparatus for reliable communication in a LoRa communication system.

2. Description of the Related Art

A long-range sub-GHz module (hereinafter referred to as "LoRa") is wireless communication technology for a middle/long distance (1 km or more) that uses sub-GHz frequency band. LoRa is one of low power wide area network (LPWAN) technical standards, which is being standardized in 915 MHz band and South Korea and the U.S. use 915 MHz band, EU uses 868 and 433 MHZ band. LoRa has low power and excellent power efficiency compared to the existing Zigbee or Wi-Fi communication module because LoRa uses lower transmission power than the communication technologies. LoRa supports wider-area communication with an effective distance of 1 km or more than the existing communication method having a short effective distance within 100 m.

LoRa has robustness in a long distance due to chirp spreading spectrum (CSS). And the physical channel is logically separated by spreading factors (SF) due to their orthogonality, so that end devices with different SFs can transmit their messages without collision. Moreover, end node of LoRa doesn't pick a single gateway as access point (AP) and all gateways relay messages from end node even if duplicated. Therefore, LoRa can provide a proper level of reliability even though LoRa adopts simple medium access control scheme such as ALOHA or listen-before-talk. When wireless transmission is performed, LoRa has high security because encrypted data is transmitted using the AES64 method and can connect several devices for client at the same time at a time.

Korean Patent No. 10-1866977 relates to a system and method for interactive managing remote device based on LoRa communication, and describes a technology for performing device management at a remote place by solving a difference in the speed of a remote device management interface and LoRa communication and constructing a low power wide-area communication system for remote device management.

PRIOR ART DOCUMENT

Patent Document

Korean Patent No. 10-1866977

SUMMARY OF THE INVENTION

Embodiments relate to a network coding method and apparatus for reliable communication in a LoRa communication system and, more particularly, provide a technology capable of providing communication having improved reliability, wherein a lost message of an end node is delivered to a stationary gateway by positioning a temporary gateway in a LoRa communication system in which the end node and a network server are connected through the stationary gateway.

Embodiments provide a network coding method and apparatus for reliable communication in a LoRa communication system, which can minimize a lost packet and reduce power waste by positioning a temporary gateway between an end node and a stationary gateway.

A network coding apparatus according to an embodiment may include a network server connected to an end node over a network to receive a packet transmitted by the end node in a LoRa communication system, a stationary gateway positioned between the network server and the end node to deliver the packet, transmitted by the end node, to the network server, and a temporary gateway positioned between the stationary gateway and the end node to deliver the packet, transmitted by the end node, to the stationary gateway.

When the temporary gateway is an active state, the temporary gateway may wiretap the packet transmission of the end node or a different temporary gateway, may store the packet transmission in a packet, and may deliver the packet in response to a request from the network server.

When the temporary gateway is an active state, the temporary gateway may receive the packet of the end node or a different temporary gateway, may form a single new packet by linearly combining the received packets, and may switch to an inactive state when a maximum activation time elapses.

The end node may transmit the packet using the temporary gateway as a delivery target when the end node recognizes that ACK is not received from the stationary gateway.

The temporary gateway may have a low operation period in which an active state and an inactive state are repeated, and may have a relatively higher operation period than the end node.

A network coding method according to another embodiment may include being connected, by a temporary gateway, to an end node over a network and receiving a packet transmitted by the end node in a LoRa communication system, and delivering, by the temporary gateway, the packet transmitted by the end node to a stationary gateway in order to deliver the packet transmitted by the end node to a network server through the stationary gateway.

Being connected, by a temporary gateway, to an end node over a network and receiving a packet transmitted by the end node may include being set, by the temporary gateway, as an active state, receiving the packet transmitted by the end node in the active state, determining whether the received packet is normal, forming a single new packet by linearly combining the received packets, checking whether a time of the active state has exceeded a preset maximum activation time, switching to an inactive state when the maximum activation time elapses, and checking whether a time of the inactive state has exceeded a preset maximum deactivation time.

Delivering, by the temporary gateway, the packet transmitted by the end node to a stationary gateway may include being set, by the temporary gateway, as an active state at an appointed time previously agreed with the network server, receiving, by the temporary gateway, a sequence of a packet that has not been received from the network server, identifying, by the temporary gateway, whether the sequence of the packet is present in a list of packets owned by the temporary gateway, transmitting, by the temporary gateway, the packet to the stationary gateway if the sequence of the packet is present in the list, deleting, by the temporary gateway, the packet, and switching, by the temporary gateway, to an inactive state.

The temporary gateway may have a low operation period in which the active state and the inactive state are repeated, and may have a relatively higher operation period than the end node.

The network coding method may further include delivering, by the stationary gateway, the packet transmitted by the end node to the network server in response to a request from the network server.

DETAILED DESCRIPTION

Figure 1:
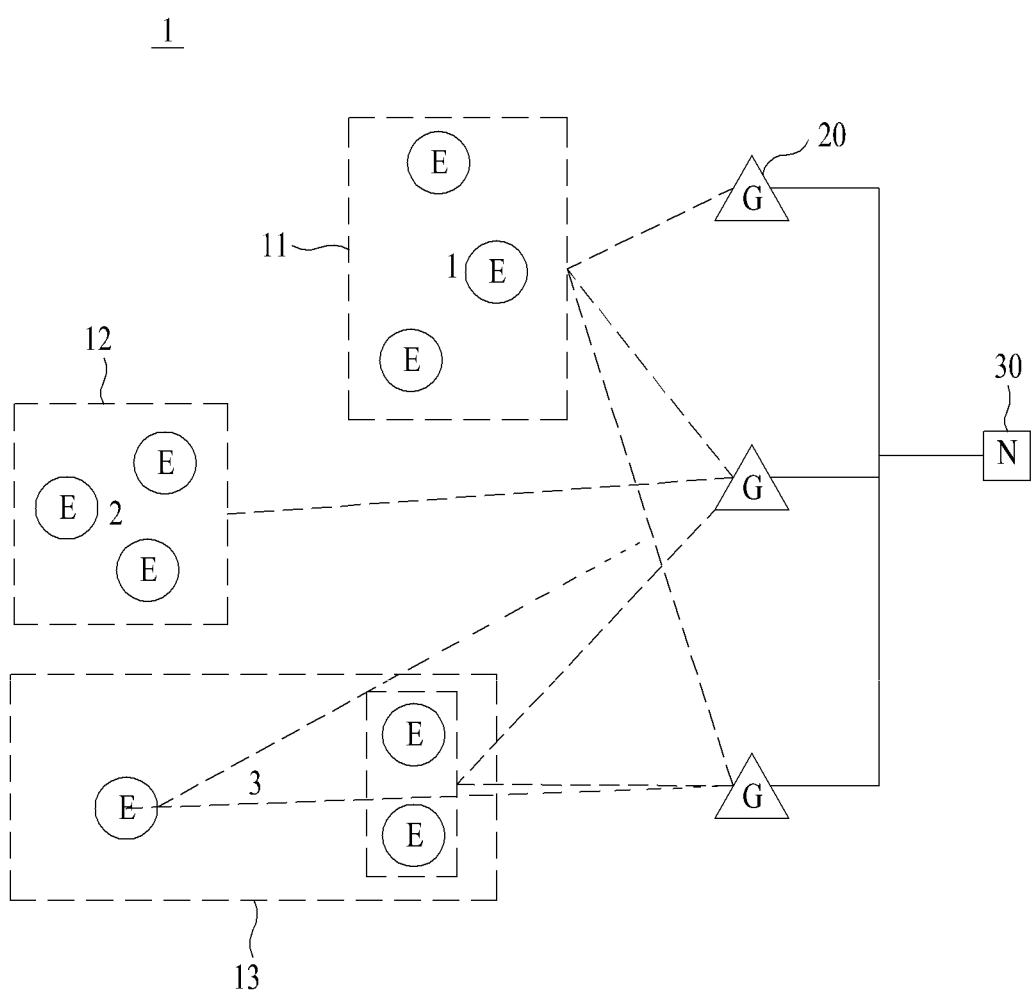
FIG. 1 is a diagram for illustrating a conventional LoRa communication system.

Hereinafter, embodiments of the present invention are described in detail with reference to the accompanying drawings. However, the described embodiments may be modified in various other forms, and the scope of the present invention is not restricted by the following embodiments. Furthermore, the embodiments of the present invention are intended to fully describe the present invention to a person having ordinary knowledge in the art to which the present invention pertains. In the drawings, the shapes, sizes, etc. of components in the drawings may be exaggerated to make the description clear.

The following embodiments relate to an apparatus and method using network coding for reliability improvements in a LoRa communication system reliability.

FIG. 1 is a diagram for illustrating a conventional LoRa communication system.

Referring to FIG. 1, the conventional LoRa communication system 1 may basically include three devices of end nodes 11, 12 and 13, a gateway 20 and a network server 30. In this case, E may denote the end node, G may denote the gateway 20, specifically, a stationary gateway, and N may denote the network server 30.

When the end node E broadcasts a message (packet) to the gateways 20 over a network, the gateway 20 that has received the message may deliver the message to the network server 30 regardless of whether the message has been delivered to a different gateway 20.

If the message is lost due to a poor channel state or a collision against a message from another end node E, the message is retransmitted. The end node E having a disadvantageous environment continues to attempt retransmission. In this case, a goal of an Internet of things (IoT) device that puts emphasis on existence continuity is not achieved.

An exemplary structure of a conventional LoRa communication system is described below.

A first end node group 11 may receive the transmission of all the end nodes E within a group from multiple gateways 20. However, a second end node group 12 may intermittently receive the transmission of all the end nodes E within a group from a small number of gateways 20. In the case of a third end node group 13, the transmission of an end node E within a group may be blocked by a different end node E.

In order to solve such a problem, the following embodiments propose an operating method between the gateway 20 and the network server 30, wherein network coding has been introduced.

Figure 2:
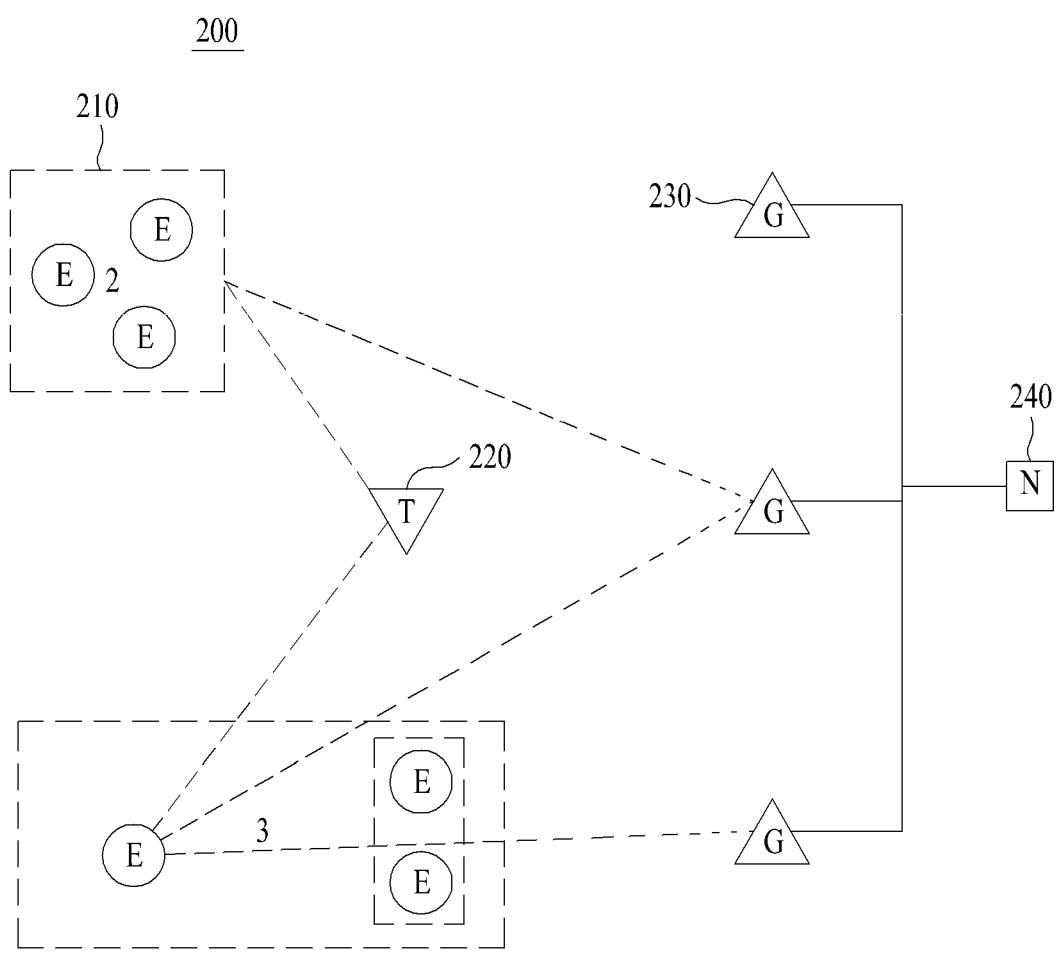
FIG. 2 is a diagram for illustrating a LoRa communication system according to an embodiment.

FIG. 2 is a diagram for illustrating a LoRa communication system according to an embodiment.

Referring to FIG. 2, the LoRa communication system 200 may include an end node 210, a temporary gateway 220, a stationary gateway 230 and a network server 240. In this case, E may denote the end node 210, T may denote the temporary gateway 20, G may denote the stationary gateway 230, and N may denote the network server 240.

In general, the LoRa communication system 200 is constructed as a star-of-stars topology, and may connect a message between the end node 210 and the backend of the server. The gateway 220, 230 may be connected to the network server 240 while the end node 210 uses single-hop wireless communication with respect to at least one gateway 220, 230. End point communication is basically performed bilaterally, but may wait in order to reduce a standby communication time or may support a task, such as multicast that may upgrade software through messages distributed in large numbers. Communication between the end node 210 and the gateway 220, 230 may affect another channel and the data speed.

The network server 240 refers to a device connected to the end node 210 over a network via the gateway 220, 230. Furthermore, the end node 210 refers to a device connected to the network server 240 over a network via the gateway 220, 230.

The end node 210 is a device to which the LoRa technology has been applied, and may perform a data transmission operation and a packet encryption/decryption function for each LoRa class. Furthermore, the gateway 220, 230 is a base station to which the LoRa technology has been applied, and may function to deliver data between the end node 210 and the network server 240 and perform an association function between a base station protocol for LoRa communication and the LoRa network server 240.

The gateway 220, 230 in the LoRa communication system according to an embodiment may include the stationary gateway 220 and the temporary gateway 230. A lost message of the end node 210 can be delivered to the stationary gateway 230 because the temporary gateway 220 is positioned. Accordingly, power waste can be reduced. That is, when the non-reception of acknowledgement (ACK) code from the stationary gateway 230 is recognized, the end node 210 may transmit a message to the temporary gateway 220, that is, a delivery target.

In this case, in the LoRa communication environment, a lost packet must be minimized. Due to the nature of a low power wide area (LPWA) having a wide transmission area, medium utilization can be reduced when a packet is duplicated and transmitted. Furthermore, in a low operation period network, the temporary gateway 220 cannot wait for the transmission of messages from all the end nodes 210.

Accordingly, the temporary gateway 220 may have a relatively higher operation period than the end node 210.

Furthermore, when the temporary gateway 220 are awake (active state), it may wiretap the transmission of a different end node 210 or a different temporary gateway 220.

In this case, an operating method of the temporary gateway 220 is described below.

The temporary gateway 220 may store the transmission of the end node 210, wiretapped while the temporary gateway 220 is awake, in a packet P. In this case, a random linear network coding (RLNC) may be used and may be represented in the following equation.

$$P \leftarrow a*P + b*newP$$

In this case, P denotes the packet, newP is a newly received packet, "a" and "b" may be randomly selected.

Furthermore, the temporary gateway 220 may determine whether or not to deliver the packet based on a request from the network server 240.

Furthermore, an operating method of the network server 240 is described below.

The temporary gateway 220 may store the transmission of the end node 210, wiretapped while the temporary gateway 220 is awake, in a packet. In this case, the above-described RLNC may be used and may be represented in the following equation.

$$P \leftarrow a*P + b*newP$$

Furthermore, the temporary gateway 220 may determine whether or not to deliver the packet based on a request from the network server 240.

Accordingly, the network server 240 does not need to handle all packets that have not been received one by one. The temporary gateway 220 does not need cooperation because it does not need to be aware that a different temporary gateway 220 has transmitted which packet one by one.

A network coding apparatus according to an embodiment may include the network server 240 connected to the end node 210 over a network to receive a packet transmitted by the end node 210 in the LoRa communication system, the stationary gateway 230 positioned between the network server 240 and the end node 210 to deliver the packet, transmitted by the end node 210, to the network server 240, and the temporary gateway 220 positioned between the stationary gateway 230 and the end node 210 to deliver the packet, transmitted by the end node 210, to the stationary gateway 230.

Referring back to FIG. 2, a network coding apparatus according to an embodiment may include the temporary gateway 220, the stationary gateway 230 and the network server 240. In some embodiments, the apparatus may further include the end node 210. In this case, the network coding apparatus according to an embodiment may include the above-described LoRa communication system 200 according to an embodiment. The elements of the network coding apparatus according to an embodiment overlap those described in the LoRa communication system 200 and are described in brief.

The network server 240 may be connected to the end node 210 over a network in the LoRa communication system, and may receive a packet transmitted by the end node 210.

The stationary gateway 230 may be positioned between the network server 240 and the end node 210, and may deliver the packet, transmitted by the end node 210, to the network server 240.

Furthermore, the temporary gateway 220 may be positioned between the stationary gateway 230 and the end node 210, and may deliver the packet, transmitted by the end node 210, to the stationary gateway 230.

In this case, the temporary gateway 220 has a low operation period in which an active state and an inactive state are repeated, and may have a relatively higher operation period than the end node 210.

In the active state, the temporary gateway 220 may wiretap the transmission of the packet of the end node 210 or a different temporary gateway 220, may store it in a packet, and may deliver the packet in response to a request from the network server 240. Specifically, in the active state, the temporary gateway 220 may receive the packet of the end node 210 or a different temporary gateway 220, may form a single new packet by linearly combining the received packets, and may switch to the inactive state when a maximum activation time elapses.

When the end node 210 recognizes the non-reception of ACK from the stationary gateway 230, it may transmit a packet to the temporary gateway 220, that is, a delivery target.

Figure 3:
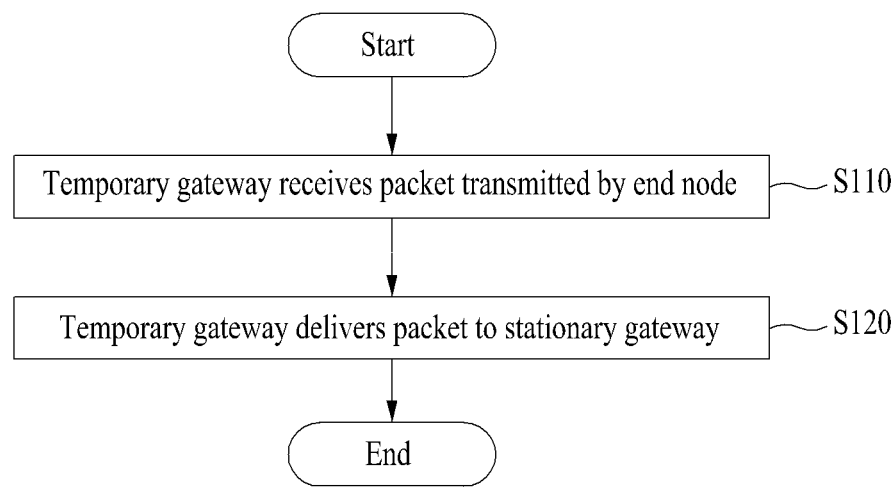
FIG. 3 is a flowchart for illustrating a network coding method according to an embodiment.

FIG. 3 is a flowchart for illustrating a network coding method according to an embodiment.

Referring to FIG. 3, the network coding method according to an embodiment may include step S110 of a temporary gateway being connected to an end node over a network and receiving a packet transmitted by the end node in the LoRa communication system, and step S120 of the temporary gateway delivering the packet, transmitted by the end node, to a stationary gateway in order to deliver the packet transmitted by the end node to a network server through the stationary gateway.

In some embodiments, the network coding method may further include the step of a stationary gateway delivering a packet, transmitted by an end node, to a network server in response to a request from the network server.

At step S110, in the LoRa communication system, the temporary gateway may be connected to the end node over a network and receive the packet transmitted by the end node.

At step S120, the temporary gateway may deliver the packet, transmitted by the end node, to the stationary gateway. Accordingly, the temporary gateway may deliver the packet, transmitted by the end node, to the network server through the stationary gateway.

Additionally, the stationary gateway may deliver the packet, transmitted by the end node, to the network server in response to a request from the network server.

Each of the steps of the network coding method according to an embodiment is described more specifically.

Figure 4:
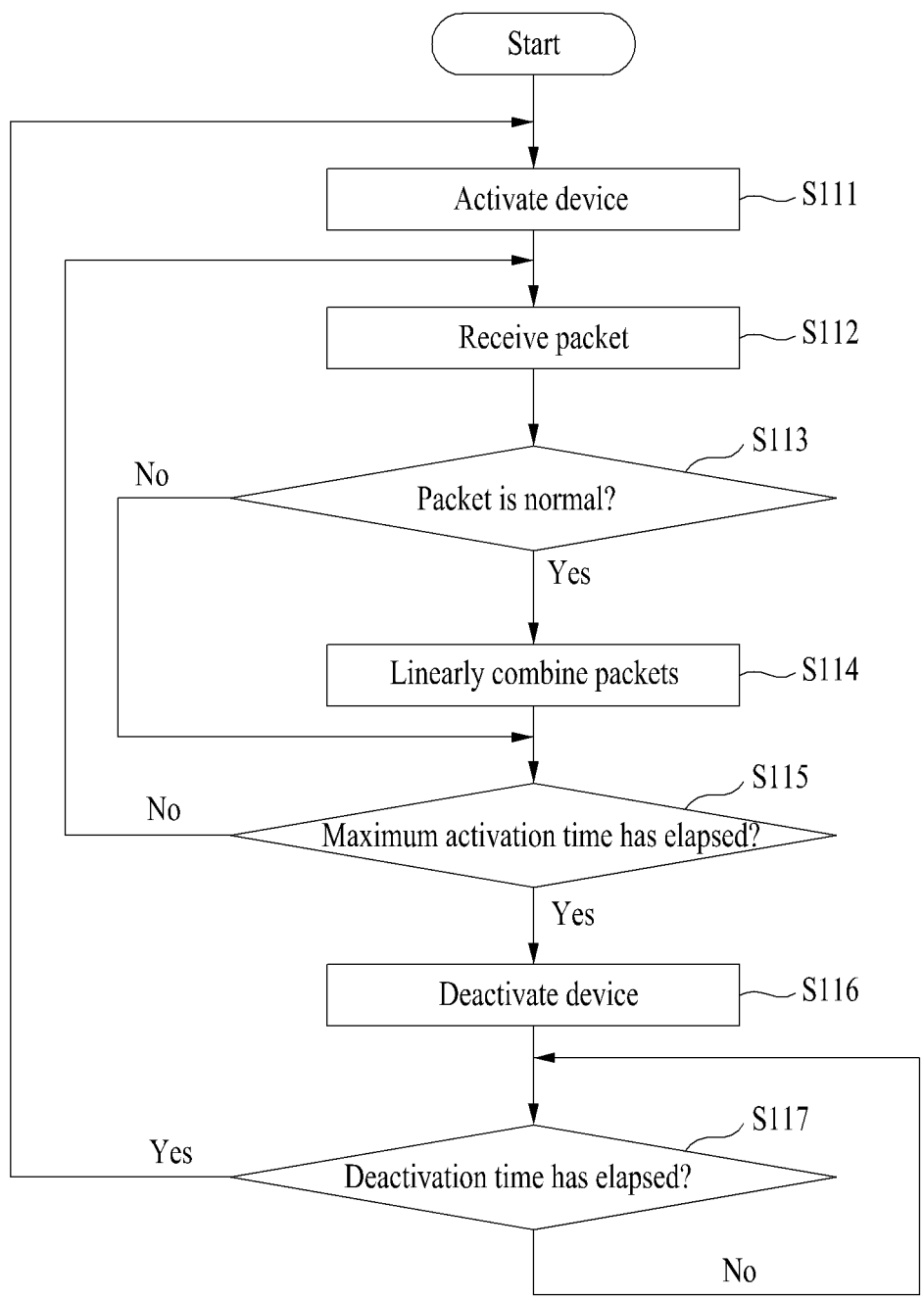
FIG. 4 is a flowchart for illustrating a packet accumulation method according to an embodiment.

FIG. 4 is a flowchart for illustrating a packet accumulation method according to an embodiment.

FIG. 4 shows a packet accumulation method of a temporary gateway according to an embodiment. The packet accumulation method may include step S110 of a temporary gateway being connected to an end node over a network and receiving a packet transmitted by the end node in the LoRa communication system, which has been described in FIG. 3.

The temporary gateway may repeatedly perform the following operation in the packet accumulation method.

The temporary gateway may receive a packet during an active time and may generate a single new packet by linearly combining the received packets. In this case, the temporary gateway may be a device having a low operation period in which activation and deactivation are repeated. Furthermore, the temporary gateway may be deactivated when a maximum activation time elapses, and may enter a sleep state.

In other words, step S110 may include step S111 of being set, by the temporary gateway, as an active state, step S112 of receiving the packet transmitted by the end node in the active state, step S113 of determining whether the received packet is normal, step S114 of forming a single new packet by linearly combining received packets, step S115 of checking whether the time of the active state has exceeded a preset maximum activation time, step S116 of switching to an inactive state when the maximum activation time elapses, and step S117 of checking whether the time of the inactive state has exceeded a preset maximum deactivation time.

Each of the steps of the packet accumulation method is described more specifically. In this case, the packet accumulation method may be performed by a temporary gateway.

At step S111, the temporary gateway may be set as the active state. In this case, the temporary gateway has a low operation period in which the active state and the inactive state are repeated, and may have a relatively higher operation period than the end node.

At step S112, the temporary gateway may receive the packet transmitted by the end node in the active state.

At step S113, the temporary gateway may determine whether the received packet is normal.

At step S114, if the received packet is normal, the temporary gateway may form a single new packet by linearly combining the received packets.

The linear combination may include generating a new packet as in the following equation and recording the sequence of the packet (packet no.), and may be represented in the following equation.

$$P \leftarrow a*P + b*newP$$

$$P\_seq \leftarrow [P\_seq, newP\_seq]$$

In this case, P is the existing packet, and newP is a newly received packet. Furthermore, P_seq is an array in which the sequence of the packet has been stored, and newP_seq is the sequence of the newly received packet. In this case, "a" and "b" are randomly selected.

If the received packet is not normal, step S114 may not be performed and step S115 may be performed. That is, if the received packet is not normal, the temporary gateway does not form a single new packet by linearly combining the packets, and checks whether the time of the active state has exceeded a preset maximum activation time.

At step S115, the temporary gateway may check whether the time of the active state has exceeded a preset maximum activation time.

At step S116, if the time of the active state has exceeded the preset maximum activation time, the temporary gateway may switch to an inactive state. If the time of the active state has not exceeded the preset maximum activation time, the temporary gateway may receive a packet transmitted by the end node again (S112).

At step S117, the temporary gateway may check whether the time of the inactive state has exceeded a preset maximum deactivation time. If the time of the inactive state has exceeded the preset maximum deactivation time, the temporary gateway may be set as an active state again (S111).

Figure 5:
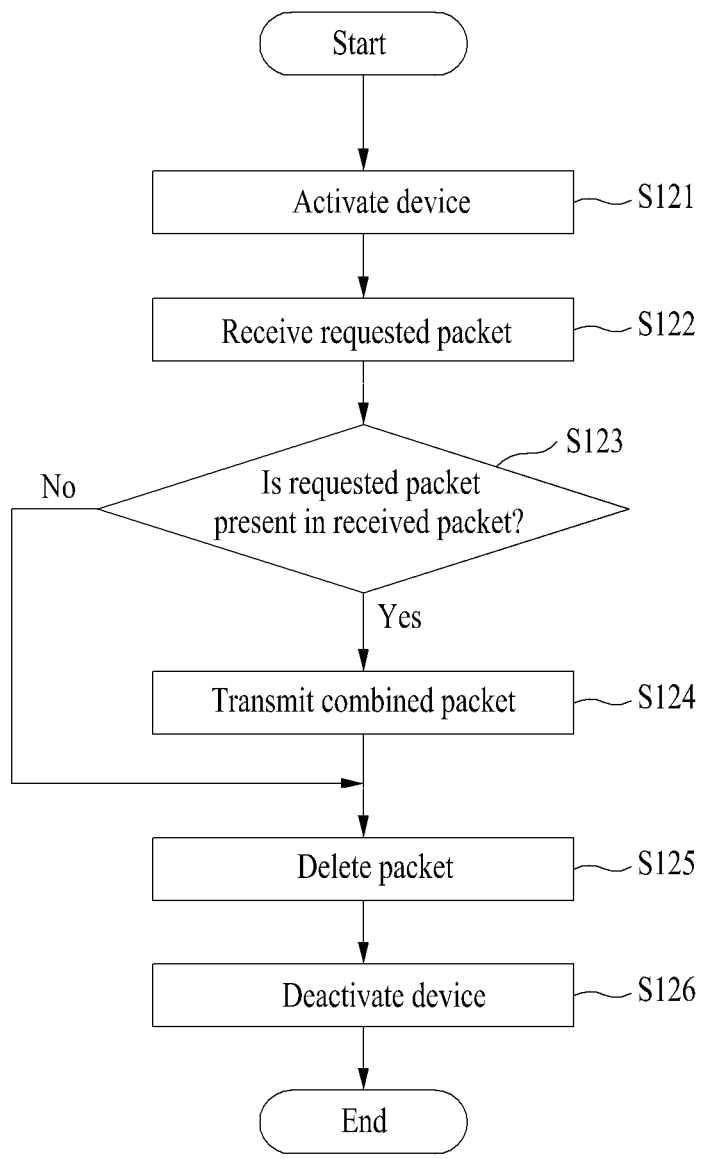
FIG. 5 is a flowchart for illustrating a packet delivery method according to an embodiment.

FIG. 5 is a flowchart for illustrating a packet delivery method according to an embodiment.

FIG. 5 shows a packet delivery method of a gateway and a network server according to an embodiment. The packet transmission method may include step S120 of the temporary gateway delivering the packet, transmitted by the end node, to a stationary gateway in order to deliver the packet transmitted by the end node to a network server through the stationary gateway, which has been described in FIG. 3.

In the packet delivery method, the network server may deliver a packet sequence that has not been received to all temporary gateways. In the packet delivery method, the network server and all the temporary gateways may activate a device at the appointed time. In the packet delivery method, the network server may deliver the sequence of a packet that has not been received to all the temporary gateways. Furthermore, each temporary gateway may identify whether the sequence of the packet is present in its packet list and deliver the packet if the sequence of the packet is present in the packet list.

In other words, step S120 may include step S121 of being set, by the temporary gateway, as an active state at the appointed time previously agreed with the network server, step S122 of receiving, by the temporary gateway, the sequence of a packet that has not been received from the network server, step S123 of identifying, by the temporary gateway, whether the sequence of the packet is present in the list of packets owned by the temporary gateway, step S124 of transmitting, by the temporary gateway, the packet to the stationary gateway if the sequence of the packet is present in the list, step S125 of deleting, by the temporary gateway, the packet, and step S126 of switching, by the temporary gateway, to an inactive state.

Each of the steps of the packet delivery method is described more specifically. In this case, the packet delivery method may be performed by the temporary gateway.

At step S121, the temporary gateway may be set as an active state at the appointed time previously agreed with the network server. That is, the network server and all the temporary gateways may activate a device at the appointed time.

At step S122, the temporary gateway may receive the sequence of a packet that has not been received from the network server. More specifically, the network server may deliver the sequence of the packet that has not been received to all the temporary gateways. Each of the temporary gateways may receive the packet.

At step S123, the temporary gateway may identify whether the sequence of the packet is present in the list of packets owned by the temporary gateway.

At step S124, if the temporary gateway owns the packet, it may transmit the packet to the stationary gateway. Accordingly, the network server may receive the packet that has not been received through the stationary gateway.

If, as a result of the identification, the sequence of the packet is not present in the list of packets, the temporary gateway may not transmit the packet to the stationary gateway, and may proceed to a next step.

Thereafter, at step S125, the temporary gateway may delete the corresponding packet.

Furthermore, at step S126, the temporary gateway may switch to an inactive state.

As described above, in accordance with the embodiments, a lost packet can be minimized and power waste can be reduced because a temporary gateway is positioned between an end node and a stationary gateway.

The above-described apparatus may be implemented as a hardware component, a software component and/or a combination of them. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure the processing apparatus to operate as desired or may instruct the processing apparatus independently or collectively. Software and/or data may be embodied in any type of a machine, component, physical device, virtual equipment or computer storage medium or device in order to be interpreted by the processing apparatus or to provide an instruction or data to the processing apparatus. Software may be distributed to computer systems connected over a network and may be stored or executed in a distributed manner. Software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may have been known to those skilled in the computer software. The computer-readable recording medium includes a hardware device specially configured to store and execute the program instruction, for example, magnetic media such as a hard disk, a floppy disk and a magnetic tape, optical media such as CD-ROM and a DVD, magneto-optical media such as a floptical disk, ROM, RAM, and flash memory. Examples of the program instruction may include high-level language code executable by a computer using an interpreter in addition to machine-language code, such as code written by a compiler.

In accordance with the embodiments, there can be provided the network coding method and apparatus for reliable communication in a LoRa communication system, wherein a lost message of an end node is delivered to the stationary gateway because the temporary gateway is positioned in the LoRa communication system in which the end node and the network server are connected through the stationary gateway.

In accordance with the embodiments, there can be provided the network coding method and apparatus for reliable communication in the LoRa communication system, which can minimize a lost packet and reduce power waste because the temporary gateway is positioned between the end node and the stationary gateway.

As described above, although the embodiments have been described in connection with the limited embodiments and drawings, those skilled in the art may modify and change the embodiments in various ways from the description. For example, proper results may be achieved although the above-described descriptions are performed in order different from that of the described method and/or the above-described elements, such as the system, configuration, device, and circuit, are coupled or combined in a form different from that of the described method or replaced or substituted with other elements or equivalents.

Accordingly, other implementations, other embodiments, and equivalents of the claims belong to the scope of the claims.

What is claimed is:

1. A network coding apparatus, comprising:
a network server connected to an end node over a network to receive a packet transmitted by the end node in a long-range sub-GHz module ("LoRa") communication system;
a stationary gateway positioned between the network server and the end node to deliver the packet, transmitted by the end node, to the network server;
a temporary gateway positioned between the stationary gateway and the end node to deliver the packet, transmitted by the end node, to the stationary gateway; and
wherein when the temporary gateway is an active state, the temporary gateway wiretaps a packet transmission of the end node or a different temporary gateway, stores the packet transmission in a packet, and delivers the packet in response to a request from the network server.

2. The network coding apparatus of claim 1, wherein when the temporary gateway is an active state, the temporary gateway receives a packet of the end node or a different temporary gateway, forms a single new packet by linearly combining the received packets, and switches to an inactive state when a maximum activation time elapses.

3. The network coding apparatus of claim 1, wherein the end node transmits the packet using the temporary gateway as a delivery target when the end node recognizes that ACK is not received from the stationary gateway.

4. A network coding apparatus, comprising:
a network server connected to an end node over a network to receive a packet transmitted by the end node in a long-range sub-GHz module ("LoRa") communication system;
a stationary gateway positioned between the network server and the end node to deliver the packet, transmitted by the end node, to the network server; and
a temporary gateway positioned between the stationary gateway and the end node to deliver the packet, transmitted by the end node, to the stationary gateway, wherein the temporary gateway has a low operation period in which an active state and an inactive state are repeated and has a relatively higher operation period than the end node.

5. A network coding method, comprising:
being connected, by a temporary gateway, to an end node over a network and receiving a packet transmitted by the end node in a long-range sub-GHz module ("LoRa") communication system;
delivering, by the temporary gateway, the packet transmitted by the end node to a stationary gateway in order to deliver the packet transmitted by the end node to a network server through the stationary gateway; and
wherein the temporary gateway has a low operation period in which the active state and the inactive state are repeated and has a relatively higher operation period than the end node.

6. The network coding method of claim 5, wherein being connected, by a temporary gateway, to an end node over a network and receiving a packet transmitted by the end node comprises:
- being set, by the temporary gateway, as an active state;
- receiving the packet transmitted by the end node in the active state;
- determining whether the received packet is normal;
- forming a single new packet by linearly combining the received packets;
- checking whether a time of the active state has exceeded a preset maximum activation time;
- switching to an inactive state when the maximum activation time elapses; and
- checking whether a time of the inactive state has exceeded a preset maximum deactivation time.

7. The network coding method of claim 5, wherein delivering, by the temporary gateway, the packet transmitted by the end node to a stationary gateway comprises:
- being set, by the temporary gateway, as an active state at an appointed time previously agreed with the network server;
- receiving, by the temporary gateway, a sequence of a packet that has not been received from the network server;
- identifying, by the temporary gateway, whether the sequence of the packet is present in a list of packets owned by the temporary gateway;
- transmitting, by the temporary gateway, the packet to the stationary gateway if the sequence of the packet is present in the list;
- deleting, by the temporary gateway, the packet; and
- switching, by the temporary gateway, to an inactive state.

8. The network coding method of claim 5, further comprising delivering, by the stationary gateway, the packet transmitted by the end node to the network server in response to a request from the network server.

* * * * *